Feb. 9, 1937.                G. L. PACE                2,070,174
                              TIE RACK
                         Filed April 15, 1935
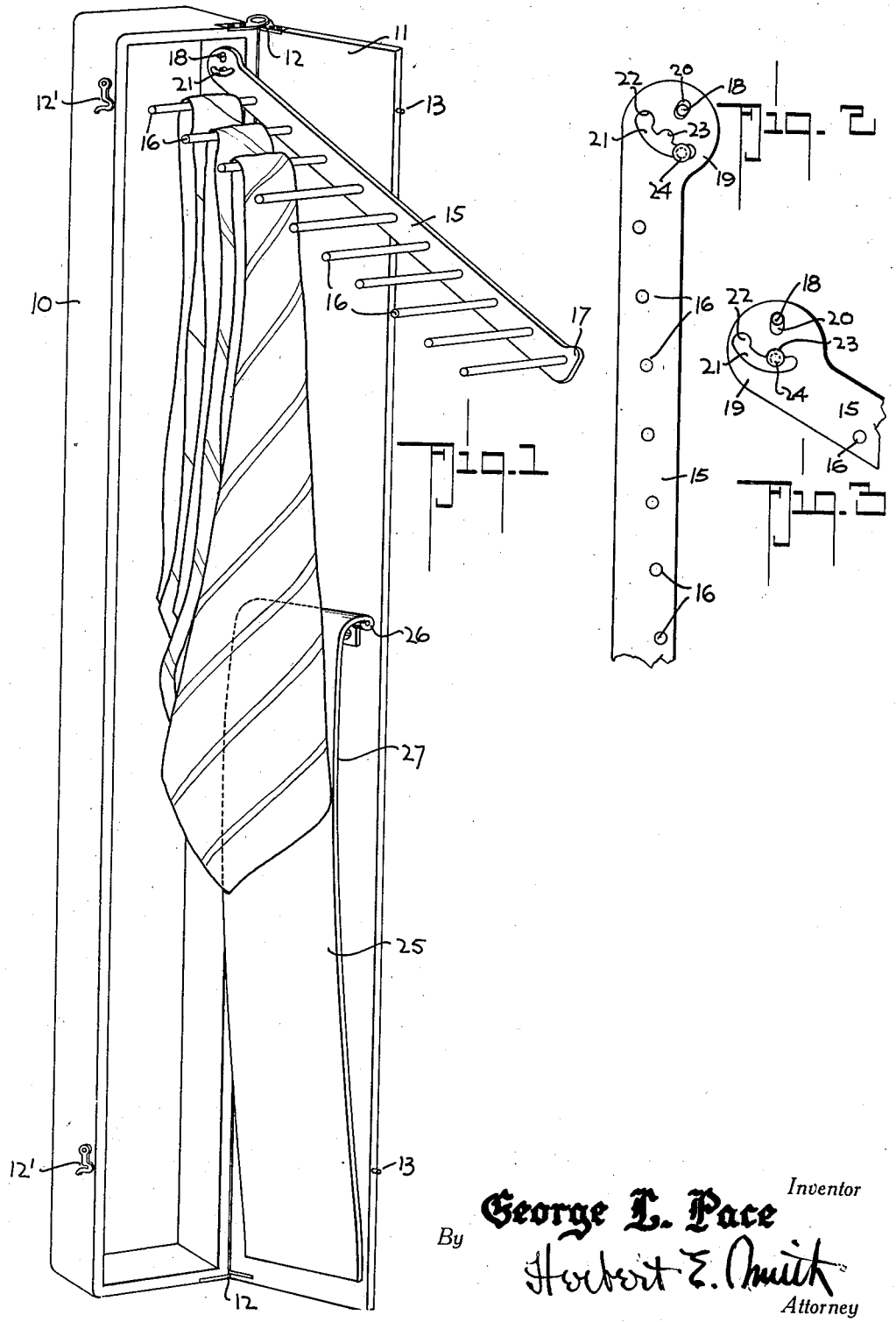
Inventor
George L. Pace
By
Herbert E. Smith
Attorney Patented Feb. 9, 1937

2,070,174

UNITED STATES PATENT OFFICE 2,070,174

TIE RACK

George L. Pace, Spokane, Wash.

Application April 15, 1935, Serial No. 16,436

2 Claims. (Cl. 312—185)

My present invention relates to improvements in tie racks for neckties, which may be individually supported upon rack pins and disposed within a cabinet or case to protect them from dust and exposure, and which rack is mounted in the cabinet and is capable of being extended therefrom and positioned for a handy selection of any given tie on the rack. The rack in its normal use and the door of the cabinet, together with means thereon, also serve to flatten the ties and hold them in a compressed manner to aid in eliminating wrinkles formed when the tie is worn. Adjustable means are provided for holding the rack in an extended position and allowing for ready return of the rack when not in use.

The invention consists in certain novel combinations and arrangements of parts in the construction of and for the operation of the tie rack as will hereinafter be more fully set forth and claimed. In the accompanying drawing I have illustrated one complete example of the physical embodiment of my invention wherein the parts are combined and arranged according to the best mode I have thus far devised for the practical application of the principles of my invention.

Figure 1 is a perspective view of the tie rack and its cabinet showing the rack ready for use for selecting one of a given number of ties.

Figure 2 is a side view of a portion of a rack-supporting bar.

Figure 3 is a fragmentary side view of the rack-supporting bar showing the bar on its supporting pivot and in one extended position.

In the preferred form of my invention I employ a cabinet 10 having sides, ends, and a back, and provided with a door or closing lid 11 hinged at the top and bottom by suitable hinge members 12. For holding the lid 11 in a closed position, suitable latch members 12' cooperating with engaging pins 13 may be used.

On one of the interior side walls of the cabinet I mount a pivoted rack bar 15 and this rack bar is supplied with a series of spaced hanger fingers 16 angularly arranged to the longitudinal axis of the rack bar. The rack bar on its extreme end is provided with an abutment 17 which is engaged by the door or lid when closed to thrust the rack bar rearwardly and cause the rack pins 16 to press upon the ties carried thereon. A pivot pin 18 by which the rack bar is supported is provided with a suitable head to insure that the bar shall remain fixed in its placement upon the interior side of the cabinet.

The head of the rack bar 19 is enlarged and a slotted pivot as 20 is provided. The supporting pin 18 passes through the slot to pivotally support the rack bar and allow a freedom of movement along the slot. Arcuately arranged from the slot 20 with the center of the radius at the upper end of the slot 20 is an enlarged slot 21 provided with notches 22 and 23 on the upper side of the slot. A second pin 24 with a suitable head is also mounted or secured into the side 14 of the cabinet to operate in the slot and to cooperate with the notches 22 and 23 to provide a locking or retaining means for holding the rack arm in a projected position. That is, when the pin 24 is engaged in the notch 23 the rack bar will be held at approximately a forty-five degree angle and projected from the cabinet.

When the notch 22 is engaged with the pin 24 the rack bar will be held in a substantially horizontal position. Since the slot 20 will allow for a certain amount of adjustment of the arm upon its pivot pin 18 provision is thus made for the engagement of the pin 24 in the several notches provided for its reception. When it is desired to release the rack bar from the projected position the pivoted end of the bar may be raised slightly to disengage the pin 24 from the notch it occupies, permitting the rack bar to be enclosed within the cabinet.

Since neckties, because of their length, will depend from the hanger fingers 16 a considerable distance the cabinet is made of dimensions to enclose all ties on the rack when the rack is in the folded position.

To provide means for firmly holding the ties and providing a pressure that will assist in smoothing all wrinkles the lower half of the door is provided with a pressure plate 25 hingably supported at the top at 26 and this plate is made of a suitable material having considerable flexibility and is formed with a curved surface as 27 to insure pressure upon the neckties held in the cabinet when the door or lid is closed.

Since the tie rack of my invention may be used without a cabinet it may be suitably mounted in the manner described, in a closet or other convenient place. The use in connection with the cabinet is a preferred form as the cabinet may be finished in accordance with the rest of the furniture or decorations in the room and this cabinet may be fastened to a chifforobe, to a wall, or to any convenient space where the neckties will be handily supported.

When a tie is to be selected the door of the cabinet is unlatched and opened and the rack bar is elevated and automatically adjusts itself to be retained in a projected position. All the ties on the rack are then easily accessible and the desired one may be selected. This operation of lifting the bar will automatically cause the bar to drop slightly on the pin 18 and the pin 24 will be engaged in one of the slots according to the placement of the bar. When the tie has been selected or other ties have been placed upon the fingers 16 the pivoted end of the bar is slightly raised, in which event it will fall downward and be received in the cabinet.

When the door is closed it puts pressure on the toe 17 of the rack arm and causes the hanger fingers to press against the ties in the rack. The pressure plate 25 will also press on the ties with a yielding resistance and the neckties will be held and pressed.

Having thus fully described my invention, what I claim as new and desire to secure by Letters Patent is:—

1. In a tie rack, the combination with a cabinet having a hinged door and fastening means therefor, of a pivoted rack arm supported in the cabinet and having a series of extending hanger fingers projecting from the side of the arm, and arranged at an angle to the longitudinal axis of said arm, an abutment on the free end of the arm to be engaged and pressed by the door, means in cooperation with the pivot of the said arm for supporting the arm in an extended position.

2. In a tie rack, the combination with a cabinet having a hinged door and fastening means therefor, of a pivoted rack arm supported on one interior side of the cabinet, a series of hanger fingers projecting from the arm, a resilient pressure plate mounted on the door and means on the free end of the arm engageable by the door upon the closing of the latter whereby the ties will be firmly pressed by both the hanger fingers and the pressure plate.

GEORGE L. PACE.